3,198,672
PREPARATION OF CUPRIC OXIDE SURFACES
Harold George De Hart, Clifton, N.J., assignor, by mesne assignments, to International Protected Metals, Inc., a corporation of New Jersey
No Drawing. Filed July 10, 1961, Ser. No. 122,667
Claims priority, application Republic of South Africa, Aug. 18, 1960, 60/3,383
8 Claims. (Cl. 148—6.14)

The present invention relates to the production of cupric oxide surfaces, in particular jet black surfaces of fine cupric oxide needles.

Such surfaces are useful for giving articles a non-reflective jet black finish, for improving heat radiating and absorbing properties of a surface and similar applications. A particularly important application of the invention is the pre-treatment of metal surfaces prior to the application of coatings, in particular paint coatings and plastic coatings of various kinds in order to produce a strong bond between the coating and the metal surface. Also the invention may quite generally be applied to the bonding of plastic to metal.

When using the term cupric oxide in this context it is realised that as far as can be established the particular cupric oxide surfaces to which this invention relates also comprise a certain amount of cuprous oxide. Apparently the fine cupric oxide needles are actually bonded to a basic copper surface by means of an intermediary layer of cuprous oxide.

It is known to produce such jet black cupric oxide surfaces by treating copper or brass surfaces with an aqueous solution of sodium hydroxide and sodium chlorite. This method can only be carried out at or near the boiling points of the solution and even then proceeds very slowly. This known process can be applied to treating any metal surface plated with copper, provided the copper layer is at least .0008 inch thick. If the copper plating is thinner, the whole copper layer will be dissolved off in the process.

It is an object of the invention to provide a superior process to the above suitable for large-scale applications.

The process in accordance with the present invention for producing a jet black layer of cupric oxide needles on a copper surface comprises treating the copper surface with an aqueous strongly alkaline solution of an energetic oxidising agent in the presence of a small to moderate concentration of cyanide ion. A chlorite will be found particularly suitable as the oxidising agent.

The cyanide ion may be introduced in the form of an alkali metal cyanide, e.g., potassium cyanide or sodium cyanide. The cyanide is preferably employed in concentrations ranging from 0.007 gram ion of cyanide per litre of solution upwards and below 0.6 gram ion of cyanide per litre.

The cyanide concentration is not very critical. Apart from other considerations which will become apparent from the remainder of this specification the cyanide concentration is chosen in accordance with the temperature at which the treatment is to take place and the time available. Too high a concentration will accelerate the process too much, whereas too low a concentration will result in a very slow reaction. Thus, it has been found that if a solution at room temperature containing 40 g. KCN per litre (corresponding to the above-mentioned normal upper limit of 0.6 g. ion of cyanide) is employed, the reaction is too violent to be adequately controlled and the solution will reach boiling point in a matter of seconds. On the other hand, a concentration of 4 g. KCN per litre (0.06 g. ion of cyanide) is normally too weak to produce a reaction rate aceeptable in practice when operating at room temperature (see, however, methods of accelerating the reaction rate described below).

At concentrations in the lower concentration range between 0.007 and 0.06 g. ion of cyanide per litre the reaction may be carried out at a satisfactory rate at temperatures above 80° C. more particularly between 90° C. and the boiling point of the solution and maintaining reaction times of 10 minutes to approximately 30 seconds. Under any of the above conditions it is preferred to stop the reaction when the surface has assumed a naplike appearance and before the copper oxide needles have grown to such lengths that substantial matting occurs.

It has also been found that cyanide concentrations near the lower end of the above-mentioned preferred limits are particularly suitable for processing surfaces coated with a very thin copper plating. Thus, a copper-plated surface on which the copper is only 0.0002 inch thick can still be processed with a solution containing 0.015 g. ion cyanide per litre, i.e., approximately 1 g. potassium cyanide per litre. A surface plated with a copper layer half that thickness can still be treated in accordance with the invention if the cyanide concentration is approximately 0.007 g. ion of cyanide per litre corresponding to approximately ½ g. of potassium cyanide per litre provided all other conditions are favourable.

The chlorite may be provided in the form of an alkali metal chlorite, e.g., sodium chlorite. Again the concentration is not very critical, and more concentrated solutions differ from a less concentrated solution mainly by a prolonged life. The preferred concentration may be, for example, 0.3 and 1.0, say approximately 0.6 to 0.7 g. ion of chlorite per litre. A preferred solution contains approximately 59 g. of sodium chlorite per litre of solution.

The alkali content is not critical either, provided the solution reacts strongly alkaline. A concentration of 1 g. mol per litre, corresponding to 40 g. of sodium hydroxide per litre has been found very suitable.

It has also been found possible to speed up the reaction rate considerably by making the surface being treated an anode in the treating solution. The voltages to be applied have been found to be advantageously in the range of approximately 3 to 24 volts. This allows operation at room temperature even at the lower end of the concentration range with good reaction rates. Of course, it is possible to combine the above-mentioned acceleration of the process with the accelerating effects of operating at higher temperatures, say of about 90° C. when it becomes possible to complete the process in a matter of seconds.

The jet black cupric oxide surfaces produced in accordance with the invention are useful for many purposes. They have an extremely low reflectivity suitable for various optical instruments. They improve heat radiating and absorbing properties of the surface treated and they are capable of absorbing oil for lubrication purposes.

If desired or required the cupric oxide needles produced by the process may subsequently be reduced to metallic copper, e.g., by heating in a reducing atmosphere, e.g., of hydrogen, cracked hydrocarbon gases, dissociated ammonia or the like, or by treating the surface with a reducing solution in order to produce special surface characteristics.

The above-described process is also particularly suitable for pre-treating metal surfaces prior to applying a coating of an organic coating composition, e.g., a thermoplastic coating, a thermosetting coating, an adhesive, a paint or a lacquer or the like, thereto. Thus the invention in its wider sense also comprises a coating process, which comprises the step of pre-treating a metal surface comprising at least an outward layer of copper in the manner specified above, followed by the application of an organic coating in a manner known per se. The pre-treated surface may be used with the fine crystal needles in the cupric oxide form or in the reduced form as desired. In either case the crystals of copper oxide are preferably only allowed to grow until the above-mentioned naplike appearance is attained and the reaction is stopped before matting becomes prevalent, which influences the bonding strength disadvantageously.

The bond thus produced between the metal surface and the organic coating is vastly superior to the bond normally attainable. Many thermoplastic resins, in particular thermoplastic powder and more particularly fluorocarbon resins including polytrifluorochloroethylene and similar substances known under the trade name "Teflon" are very reluctant to undergo any bond at all with a metal surface. Such substances may now be bonded extremely strongly to metal surfaces. Contrary to usual experiences, the bonds thus produced are not destroyed by water, not even by boiling water, provided the coating material itself can stand up to the action of water.

In recent years various methods of coating with powders, in particular with thermoplastic resin powders, including thermoplastic powders having in addition reaction curing properties, have become increasingly popular, partly because of the great versatility of such methods. Again it is found in practice that the bonding strengths obtained with one and the same coating material may differ considerably depending on the manner in which the powder is applied (e.g., by ordinary contacting such as rolling in or dipping into a bed of the loosely settled powder, by contacting with a fluidised bed of powder, by contacting with a powder in a state of aeration intermediate between that of a fluidised bed and the loosely settled powder hereinafter referred to as "static aerate" and as described in copending U.S. application Serial No. 846,376, filed October 14, 1959, now abandoned, by contacting a pre-heated article with the powder entrained in a gas stream or by flame spraying the article with the powder. The judicious application of the surface pre-treatment specified above to any one of the above-mentioned coating processes employing coating powders will always result in satisfactory bonding of the coating.

The scope of the invention also includes a new composition for producing jet black surfaces composed of copper oxide needles on copper, brass and bronze surfaces and which composition comprises, in a form suitable to be dissolved in water, firstly an alkali in adequate amount to produce a strongly alkaline solution, secondly an energetic oxidising agent, e.g., a chlorite, as a main constituent and thirdly a small to moderate amount of a cyanide and furthermore includes the aqueous solutions produced from such compositions. The components are preferably so chosen and proportioned that the composition can be diluted to a solution containing between 0.007 and 0.6 g. ion of cyanide per litre, between 0.3 and 1.0 g. ion of chlorite per litre, and enough alkali to render the solution strongly alkaline, e.g., to raise the pH to at least 12.

The invention and the manner in which it may be put into practice will be further described in the following examples.

*Example 1*

40 g. of sodium hydroxide, 59 g. of sodium chlorite and 1 g. of potassium cyanide were dissolved in water and made up to 1 litre of aqueous solution. Pure copper, brass and bronze surfaces were treated by immersing them in this solution. The treatment could be carried out at 94° C., in which case it was completed after approximately 3 to 4 minutes. The treatment when carried out at approximately 100° C. was completed after 30 seconds.

It was found that when working at temperatures of 90° C. or higher the reaction should not be allowed to proceed for more than 10 minutes. Under all processing conditions the production of a naplike surface was aimed at, whereas the occurrence of substantial degrees of matting of the crystal needles served as an indication of too long periods of processing.

The treatment could also be applied to copper-plated metal surfaces, provided the copper plating was not less than 0.0002 inch thick. In all cases, the process resulted in a perfect jet black velvetlike surface of tiny cupric oxide needles. The cupric oxide needles could be easily reduced to metallic copper if desired.

By reducing the concentration of potassium cyanide to ½ g. per litre it was even found possible to treat a surface in the manner described, of which the copper layer was only .0001 inch thick.

Coating a pre-treated surface with a thermoplastic powder is preferably carried out by the following method:

The work piece is pre-heated to the temperature required for fusing the desired thickness of particulate thermoplastic material onto the surface. For example the object is heated to approximately 200° C. and immersed for 1 to 5 seconds (depending on the thickness of coating desired) in a static aerate (as specified above) of a polyethylene or a heat stabilised polyvinylchloride powder. For coating with "Penton" powder (a thermoplastic chlorinated polyether) the object is pre-heated to a similar temperature to the above. For coating with thermoplastic fluorocarbon resins, temperatures of the order of 300° C. may be employed. In each case the correct pre-heating temperature is chosen in accordance with the particular powder being used, the heat capacity of the article to be coated and the thickness of coating to be applied. Another factor to be taken into consideration is the decomposition temperature of the coating material and the temperature of thermal deterioration of the article being coated. Since thermal degradation of a resin is also a function of time, it is possible to work at comparatively high temperatures if desired, provided steps are taken to ensure the rapid cooling of the article below the degradation temperature as soon as possible after the fusion is completed.

Simply shaped objects may also be immersed or rolled in a bed of loosely settled powder of the type described above.

It is also possible to immerse the object in a fluidised bed instead of a static aerate, provided the shape of the object is not too complicated and provided the comparatively high heat losses in a fluidised bed are not considered disadvantageous.

In some cases it may be necessary to maintain the coated article in a heated space in order to complete the fusing process to the desired degree.

"Teflon" powder was fused onto some of the treated surfaces, both before and after the cupric oxide needles had been reduced, and in all cases an extremely strongly bonding "Teflon" coating was produced, which was not affected by boiling in water for thousands of hours, and which could not be loosened with a knife. Similar results were obtained with other plastic compositions, lacquers and enamels.

*Example 2*

The surface treatment of a copper surface described in Example 1 is repeated at room temperature. The reaction is almost imperceptible.

The object to be treated is then made an anode in the solution. By applying voltages between 3 and 24 volts reaction rates may be produced equivalent to much higher reaction temperatures.

By applying voltages of the order of 20 volts and temperatures of the order of 90° C. it becomes possible to complete the process in a matter of seconds.

What I claim is:

1. A process for producing a jet black layer of cupric oxide needles on a copper surface which comprises treating the copper surface with an aqueous strongly alkaline solution having a pH value of at least 12 of an alkaline metal chlorite oxidising agent and from 0.007 to 0.6 gram ion of cyanide per litre.

2. A process as claimed in claim 1 comprising treating the copper surface with said solution containing between 0.3 and 1.0 gram ion of chlorite per litre.

3. A process for producing a jet black layer of cupric oxide needles on a copper surface which comprises treating the copper surface with an aqueous strongly alkaline solution having a pH value of at least 12 of an alkaline metal chlorite oxidising agent and from 0.007 to 0.6 gram ion of cyanide per litre until the surface has assumed a naplike appearance and stopping the reaction before the copper oxide needles have grown to such lengths that substantial matting occurs.

4. A process as claimed in claim 3 comprising treating the copper surface with said solution containing between 0.007 and 0.06 gram ion of cyanide per litre at temperatures between 90° C. and the boiling point of the solution and maintaining reaction times of 10 minutes to approximately 30 seconds.

5. A process for producing a jet black layer of cupric oxide needles on a copper surface which comprises electrolytically treating the copper surface with an aqueous strongly alkaline solution having a pH value of at least 12 of an alkaline metal chlorite oxidising agent and from 0.007 to 0.6 gram ion of cyanide per ltire with the surface being treated being an anode in the treating solution.

6. A process as claimed in claim 5 comprising applying to the anode voltages in the range of approximately 3 to 24 volts.

7. A coating process which comprises pre-treating a surface to be coated having at least an outer layer consisting essentially of metallic copper with an aqueous strongly alkaline solution having a pH value of at least 12 of an alkaline metal chlorite oxidising agent and from 0.007 to 0.6 gram ion of cyanide per litre until the surface has assumed a naplike appearance of cupric oxide needles and stopping the reaction before the copper oxide needles have grown to such lengths that substantial matting occurs, and bonding a resin coating composition to the thus pretreated surface.

8. A process as claimed in claim 7 comprising reducing the copper oxide needles to metallic copper prior to the application of said resin coating composition.

References Cited by the Examiner

UNITED STATES PATENTS

| | | | |
|---|---|---|---|
| 2,077,450 | 4/37 | Weisberg et al. | 148—6.14 |
| 2,460,896 | 2/49 | Meyer | 148—6.14 |

RICHARD D. NEVIUS, *Primary Examiner.*

MARCUS U. LYONS, *Examiner.*